July 30, 1935.  G. BLAUFUSS  2,009,382

FILTER

Original Filed May 31, 1933   2 Sheets-Sheet 1

INVENTOR.
George Blaufuss.
BY Townsend & Loftus.
ATTORNEYS.

July 30, 1935.　　　　G. BLAUFUSS　　　　2,009,382
FILTER
Original Filed May 31, 1933　　2 Sheets-Sheet 2

INVENTOR.
George Blaufuss.
BY Townsend & Loftus.
ATTORNEYS.

Patented July 30, 1935

2,009,382

UNITED STATES PATENT OFFICE 2,009,382

FILTER

George Blaufuss, Napa, Calif.

Application May 31, 1933, Serial No. 673,690
Renewed June 1, 1935

5 Claims. (Cl. 210—201)

This invention relates to filters for filtering liquid material, such as beer, wine, etc., and especially to a filter which is self-cleaning and continuous in operation.

The object of the present invention is to generally improve and simplify the construction and operation of filters of the character described; to provide a filter in which a filtering medium such as diatomaceous earth, or the like, is used and applied to the surface of a cylinder to form a thick filter cake through which the liquid to be filtered must pass; to provide means for continuously removing impurities collected on the surface of the filter cake and also a portion of the filter cake so as to gradually decrease the thickness of the cake; and further, to provide means for continuously discharging the impurities and material removed from the surface of the filter cake.

The filter is shown by way of illustration in the accompanying drawings, in which—

Figure 1:
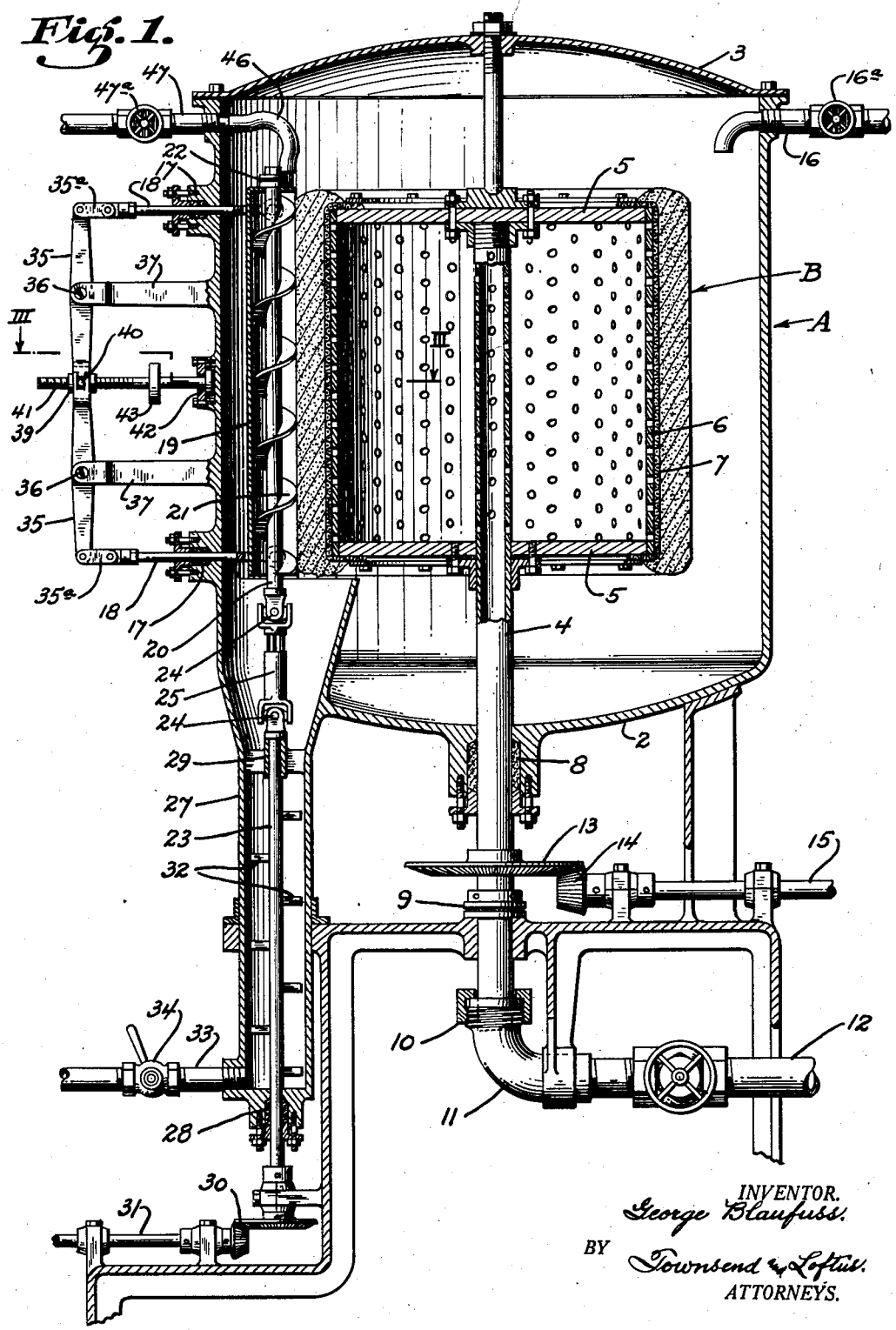
Fig. 1 is a central vertical longitudinal section of the filter.

Referring to the drawings in detail, and particularly Fig. 1, A indicates a cylindrical-shaped casing provided with an integral bottom member 2 and a removable cover section 3. Extending centrally through the bottom section is a hollow or tubular shaft 4 and secured thereon is a filter drum generally indicated at B. This drum consists of a pair of head members 5—5 secured to the shaft 4 in any suitable manner, and secured by said head members is a cylindrical perforated plate 6 about which is wound a fabric covering 7, which is provided for the purpose of permitting the building up of a filter cake hereinafter to be described. The shaft 4 extends through a stuffing box 8 formed in the lower part of the casing, and it is supported by a bearing 9. The lower end of the shaft extends into a stuffing box 10 and this terminates in an elbow 11 which is connected with a discharge pipe 12. Secured on the shaft 4 below the stuffing box 8 is a bevel gear 13 and intermeshing therewith is a bevel pinion 14 which is secured on the drive shaft 15.

In actual operation shaft 15 is continuously rotated and power is thus transmitted through the gears 13 and 14 to continuously and slowly rotate the filter drum B. The liquid to be filtered is admitted to the casing through a valve controlled pipe 16 and the material when filtered discharges through the tubular shaft 4, the stuffing box 10, an elbow 11 into pipe 12 by which it may be conveyed to any point desired.

One of the salient features of the present invention is the provision of means for building up a filter cake on the surface of the drum, and after the cake is built up, to provide means for removing the impurities collecting on the surface of the cake, and also for cutting away the surface of the cake to reduce the density thereof. This is accomplished as follows: Formed on one side of the casing are a pair of stuffing boxes 17—17, and extending therethrough are rods 18—18 on the inner end of which is supported a tube 19. Extending through the tube is a shaft 20 and formed thereon is a helical-shaped cutter or scraper 21. The upper end of the shaft is journaled in a bearing 22 carried by the upper end of the tube. The lower end of the shaft is connected with a driving shaft 23 through means of a pair of universal couplings 24 and an intermediate telescoping splined shaft 25. Shaft 23 passes downwardly through a mud well or tubular extension 27 formed on the casing and it passes through a stuffing box 28 at the lower end, the upper end of shaft 23 being held by a bearing 29. Shaft 23 is continuously driven through a pair of bevel gears 30 and the drive shaft 31 and the speed of rotation is comparatively slow. Impurities collecting on the surface of the filter cake are sheared or scraped off by means of the helical member 21, as this extends through a slot 21a formed in the side of the tube adjacent the filter cake. The material thus scraped off passes downwardly through the tube and into the mud well 27. In the well the mud is kept in a more or less plastic condition by agitating arms or fingers 32; that is, these arms tend to break up any lumps, or the like, and to maintain the impurities and other material delivered to the well in a semi-fluid condition and this material is discharged through a pipe 33 controlled by means of a valve 34, the discharge being continuous or intermittent as desired.

The tube 19 which carries the helical-shaped scraper 21, as previously stated, is supported on the inner ends of the rods 18. These rods are movable inwardly or outwardly so as to move the tube 19 and scraper 21 to or away from the filter drum B, this being essential as a filter cake must be built up on the surface of the drum and after it has been built up it must be gradually reduced in thickness as filtering proceeds.

Figure 4:
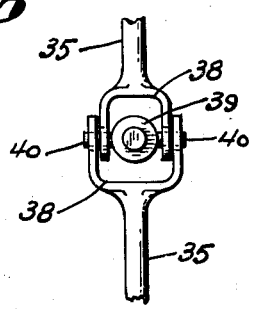
Fig. 4 is a plan view of a nut and the inner ends of a pair of levers actuated thereby.

The means for moving the rods 18 and the tube 19 is here illustrated as consisting of a pair of arms, the outer ends 35 of which are connected through links 35a with the rods 18. The levers 35 are pivotally supported as at 36 by bracket arms 37 and the inner ends of the arms are fork-shaped, as shown at 38 in Fig. 4, to straddle a nut 39; this nut having a pair of pins 40 which extend through slots in the forks. The nut is carried by a screw rod 41 and this is secured to the casing by a bearing 42, the screw rod being turned manually by means of a hand wheel 43. If it is desired to move the cleaning unit to or away from the surface of the filter drum it is only necessary to rotate the hand wheel 43, such rotation causes the nut 39 to move inwardly or outwardly on the rod and as this nut is connected with the inner ends of the arms they will swing about their pivots 36 and transmit movement through the link 35a to pull the rods 18 outwardly or to push them inwardly as the case may be. In this manner any adjustment desired may be maintained between the auger-shaped scraper and the surface of the filter cake.

Figure 2:
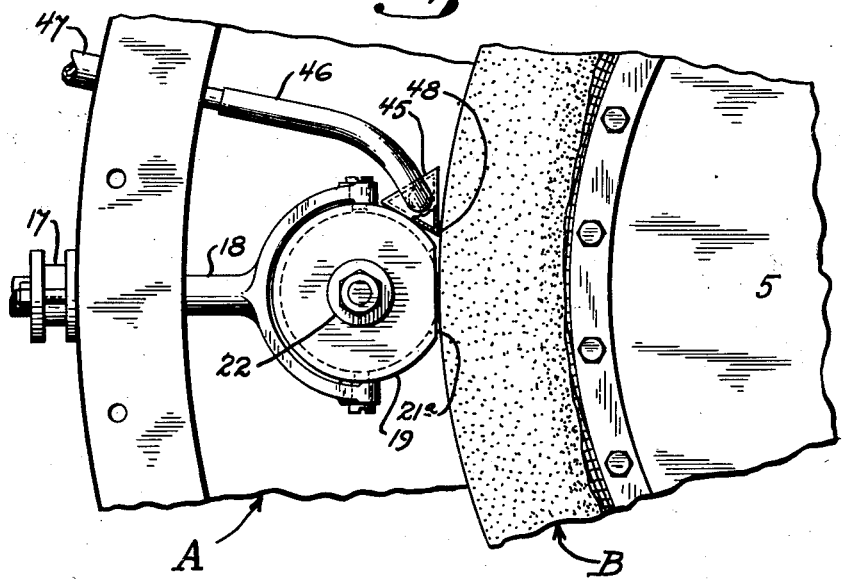
Fig. 2 is an enlarged partial plan view of a portion of the filter cylinder, the tube whereby diatomaceous earth is applied thereto, and the cleaning element whereby impurities are removed from the surface of the filtering medium.
Figure 3:
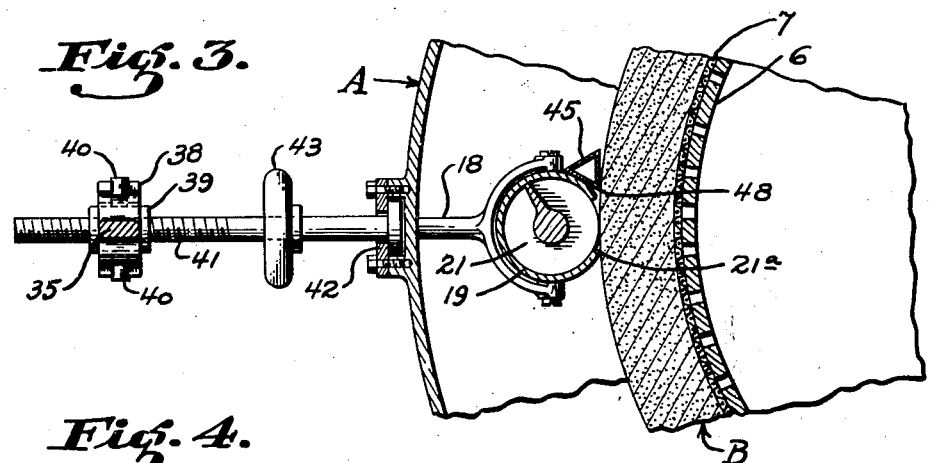
Fig. 3 is an enlarged cross section taken on line III—III of Fig. 1.

Secured to one side of the tube 19 which forms a housing for the helical-shaped scraper, is a tube 45 which is triangular shaped in cross section, see Fig. 2. This tube extends from end to end of the tube 19. The upper end is connected through means of a flexible tube, such as a rubber hose 46, with a pipe 47 which is connected with a casing. This pipe is connected with a tank and a pump, hereinafter to be described, and functions as a means for delivering a mixture of filter medium and liquid to the surface of the filter drum; the tube 45 being provided with a slot extending from end to end thereof, as indicated at 48, through which the filter medium discharges against the surface of the drum when it is being applied.

In actual operation it is obvious that a number of different types of filtering mediums may be employed but for purposes of description the application of diatomaceous earth will be described. If beer is to be filtered, clean filtered beer can be placed in a tank and diatomaceous earth will be added thereto and mixed with the beer. The tank is connected with a pressure pump and this is, in turn, connected with the pipe 47. The casing A is next filled with clean beer through pipe 16, the admission of beer being controlled by the valve 16a and the admission of a mixture of diatomaceous earth and beer being controlled by the valve 47a, the beer returning through pipe 16 also enters under pressure. The beer under pressure will obviously flow through the fabric covering 7 on the drum and will discharge through the hollow shaft 4 and finally through the pipe 12 and it may be returned by said pipe to the source of supply to be circulated over and over again until the proper thickness of filtering cake has been applied. The mixture of diatomaceous earth and beer received through pipe 47 and entering the pipe 45 will discharge through the slot 48 against the surface of the filter drum. The beer will obviously pass through the surface while the diatomaceous earth will collect on the surface and as the drum is slowly rotated an even uniform deposit will be insured, and as the thickness of the deposit increases the tubes 19 and 45 may be moved outwardly through the adjusting or controlling mechanism actuated by the hand wheel 43. When the proper thickness of cake has been built up, valve 47a will be closed and the beer to be filtered will then be admitted through valve 16a and pipe 16 and the filtering operation will start and just as soon as the beer, or other liquid filtered, discharges in clear form it may be conveyed through pipe 12 to the bottling tanks, or other receptacles provided therefor.

After actual filtering of the beer has started yeast, which is the impurity to be removed from the beer, begins to collect on the surface of the filter cake and it builds up a gradually increasing resistance and, as the resistance increases, the pressure on the filter cake becomes greater and greater tending to compact the same. The filter surface thus decreases in diameter and moves away from the helical-shaped scraper but by merely slightly turning the handwheel 43 the scraper can be moved into position as the cake decreases due to compacting. Furthermore, if the yeast deposit becomes too thick the resistance will become so great that the capacity of the filter will be materially reduced but such increase in thickness is avoided by maintaining the helical-shaped scraper in continuous operation. This scraper, by the way, is slowly rotating so as to produce as little agitation as possible. It is furthermore engaging the deposit on the filter surface with a shearing, cutting action and as such readily removes it and without disturbing or injuring the body of the filter cake. The yeast or other impurities removed are carried by the helical-scraper into the top of the mud well 27, and if solid chunks enter they are stirred or broken up by the agitating arms or fingers 32, thus reducing the impurities to a plastic or thin soup-like condition which may be readily discharged by slightly opening the valve 34. In fact, this valve may be partially open during the entire operation of the filter so as to insure a continuous discharge of the impurities.

After a filter has been in operation for some time it is found that a certain percentage of the impurities enter the body of the filter cake and thereby gradually increase its resistance to the flowing liquid. These impurities obviously collect adjacent the outer surface of the cake, hence when the resistance becomes too great the helical scraper may be adjusted to not only remove the deposit of impurities on the exterior of the cake but also to remove a portion of the outer surface of the cake. This can be done from time to time as the density of the cake increases and the filter cake may thus be employed over a long period of time, as it can be gradually reduced in thickness by shearing off the outer surface, and when the cake deposit has been substantially used up a new cake may be built up in the manner previously described.

From the foregoing it will be noted that the filter is continuous in operation as the impurities collecting will be continuously removed. The life of the filter cake is very materially increased as its outer surface may be shaved off to reduce thickness as occasion demands. Agitation within the casing A during filtration is reduced to a minimum as the rotation of the filter is slow and the helical scraper whereby the impurities are removed is mounted in a housing so that the impurities are conveyed downwardly through the tube into the mud well. In fact, all impurities and the liquid to be filtered have a downward gravitational travel so that there is little tendency to stir up the sediment and re-deposit it on the filter surface.

While the filter has been described as a pressure filter, it is obvious that it may function just as well as a vacuum filter, this being accomplished by connecting the discharge pipe 12 with a suction pump, or the like. The operation will obviously be the same whether pressure or vacuum is employed, and while certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A filter comprising a casing, a filter drum mounted within the casing, means for maintaining a flow of liquid to be filtered through the casing, the filter drum, and through a discharge connected with the drum, means for rotating the filter drum, a slotted tube mounted adjacent one side of the filter drum, means for moving said tube to and away from the surface of the drum, and means connected with said tube for delivering a mixture of filtering medium and liquid, said liquid functioning as a carrier to deposit a filtering medium on the surface of the drum and to build up a filter cake thereon.

2. A filter comprising a casing, a filter drum mounted within the casing, means for maintaining a flow of liquid to be filtered through the casing, the filter drum, and through a discharge connected with the drum, means for rotating the filter drum, a slotted tube mounted adjacent one side of the filter drum, means for moving said tube to and away from the surface of the drum, means connected with said tube for delivering a mixture of filtering medium and liquid, said liquid functioning as a carrier to deposit a filtering medium on the surface of the drum and to build up a filter cake thereon, and other means mounted adjacent the surface of the drum for cutting into the surface of a deposited filter cake and for gradually removing and reducing the thickness of the cake.

3. A filter comprising a vertically disposed cylindrical-shaped casing, a vertically disposed cylindrical-shaped filter drum mounted in the casing, means for rotating the drum, means for maintaining a flow of liquid to be filtered through the casing and the drum and through a discharge connection connected with the drum, a vertically disposed helical-shaped scraper positioned at one side of the filter drum and extending from end to end thereof, a housing surrounding the scraper, said housing having a slot formed in one side through which the helical scraper projects to engage the filter surface of the drum, means for rotating the helical-shaped scraper, and means for effecting relative movement of the scraper and filter drum toward and away from each other.

4. A filter comprising a vertically disposed cylindrical-shaped casing, a vertically disposed cylindrical-shaped filter drum mounted in the casing, means for rotating the drum, means for maintaining a flow of liquid to be filtered through the casing and the drum and through a discharge connection connected with the drum, a vertically disposed helical-shaped scraper positioned at one side of the filter drum and extending from end to end thereof, a housing surrounding the scraper, said housing having a slot formed in one side through which the helical scraper projects to engage the filter surface of the drum, means for rotating the helical-shaped scraper, a pair of rods secured to the housing and extending through the walls of the filter casing, and manually controlled adjustable means connected with said rods for moving the rods, together with the housing and the helical scraper mounted therein, to or away from the surface of the filter drum.

5. A filter comprising a vertically disposed cylindrical-shaped casing, a vertically disposed cylindrical-shaped filter drum mounted in the casing, means for rotating the drum, means for maintaining a flow of liquid to be filtered through the casing and the drum and through a discharge connection connected with the drum, a vertically disposed helical-shaped scraper positioned at one side of the filter drum and extending from end to end thereof, a housing surrounding the scraper, said housing having a slot formed in one side through which the helical scraper projects to engage the filter surface of the drum, means for rotating the helical-shaped scraper, a support for the housing and the helical scraper mounted therein, said support being manually adjustable to move the housing and the scraper to and away from the surface of the filter drum, a mud well forming a continuation of the bottom of the filter casing and aligning with the housing containing the helical scraper, said mud well adapted to receive material removed from the surface of the filter drum by the helical scraper, agitating means in the mud well to prevent solidification of the removed material, and other means for moving mud from the well.

GEORGE BLAUFUSS.